Patented July 5, 1949

2,475,557

UNITED STATES PATENT OFFICE 2,475,557

COPOLYMERS OF UNSATURATED ESTERS OF 9,10-DIHYDROXYSTEARIC ACID

Daniel Swern, Philadelphia, and Geraldine B. Dickel, Monongahela, Pa., assignors to the United States of America as represented by the Secretary of Agriculture No Drawing. Application July 3, 1947, Serial No. 758,974

10 Claims. (Cl. 260—78.3)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to plastic compositions. It relates particularly to copolymers of unsaturated esters of 9,10-dihydroxystearic acid with olefinic compounds and has among its objects the provision of new compositions of matter and methods for their preparation.

It is known that a number of long chain compounds derived from fats and oils possess properties that render them useful as softeners and plasticizing agents. Utilization of such compounds in the production of plastics is often limited, however, by their low compatibility with many high molecular substances and their tendency to exude from admixtures with such products, thereby imparting an undesirable "greasy feel" and a "foggy" appearance to the plasticized material. These inherent disadvantages of long chain modifiers and plasticizing agents can be obviated by the production of intramolecularly plasticized compositions, wherein the plasticizing or modifying agent is chemically bound in the polymer molecule by copolymerization with a reactive monomer. Heretofore, one difficulty in making the fatty compound an integral part of the polymer molecule by a copolymerization process has been the lack of suitable fat or oil derivatives containing the necessary functional groups.

We have found that esters of hydroxy fat acids, such as 9,10-dihydroxystearic acid, with unsaturated alcohols can be copolymerized with polymerizable olefinic monomers, thereby modifying the characteristics and imparting desirable properties to the resulting polymeric material. While our invention is not limited to any particular hypothesis as to the mechanism of the polymerization process, the properties of the polymeric material appear to indicate that at least some of the 9,10-dihydroxystearic acid ester is chemically bound in the polymer molecule.

In accordance with the method of our invention a mixture of monomers comprising an unsaturated ester of 9,10-dihydroxystearic acid and an active olefinic monomer is polymerized by any suitable means such as heat, light and, or, a catalyst. Preferably, polymerization is effected by heating the monomer mixture at a temperature of about 40° to 100° C. in the presence of a polymerization catalyst or initiator such as an organic peroxide like benzoyl, lauroyl, or stearoyl peroxide; a persulfate like ammonium persulfate; or other similar compounds commonly utilized as catalytic agents in the production of high molecular polymers. The polymerization process can be conducted either by bulk polymerization of the monomer mixture, or by emulsion polymerization, or in the presence of suitable inert solvents or diluents.

The method of the present invention is applicable to esters of 9,10-dihydroxystearic acids with unsaturated aliphatic alcohols, and in particular to esters having the general formula

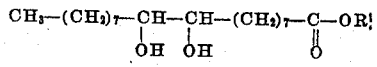

where R is an unsaturated aliphatic hydrocarbon radical containing at least two carbon atoms. The preferred R radicals are those free of substituents other than halogen, such as vinyl, and allyl, methylallyl, chloroallyl or bromoallyl radicals containing the grouping

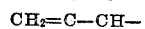

One or several of the aforementioned esters can be copolymerized with various active olefinic monomers, for example, vinyl compounds like vinyl chloride or vinyl acetate, unsaturated phthalates such as diallyl phthalate, acrylonitrile, polymerizable derivatives of maleic acid anhydride such as diallyl maleate, isobutylene, isoprene, styrene, and butadiene, used either singly or in combination.

The characteristics of the materials thus obtained can be varied by the choice of and the relative proportions of the individual components present in the monomer mixture and the conditions of polymerization. The unsaturated esters of 9,10-dihydroxystearic acid suitable for use in our process may be prepared, for example, according to methods described by Swern, Jordan and Knight in their application for patent, Serial No. 665,040, filed April 26, 1946. Thus, they may be obtained by direct esterification of 9,10-dihydroxystearic acid or from an ester of that acid by alcoholysis with the corresponding unsaturated alcohol. The two 9,10-dihydroxystearic acids, having melting points 95° C. and 130° C., respectively, which may be used as starting materials in the direct esterification method, are readily prepared from oleic and elaidic acids by oxidation with hydrogen peroxide, potassium permanganate, or other suitable means, as taught in said application.

The following Examples I through III describe the preparation of unsaturated esters of 9,10-dihydroxystearic acid. Others are found in Serial No. 665,040.

EXAMPLE I

A mixture of 9,10-dihydroxystearic acid, melting point 130° C. (15.8 g.), allyl alcohol (29 ml.) and naphthalene-beta-sulfonic acid (0.316 g.) was heated at 95° to 100° C. for about 8 hours. The solution was poured into hot water (95° C.) and an upper oil layer was obtained. The mixture was allowed to cool until the oil was solidified and the aqueous layer was separated and discarded. The solid material was broken up and dried. It weighed about 17 g. and consisted mainly of allyl 9,10-dihydroxystearate. Recrystallization to constant melting point from 95% ethyl alcohol yielded pure allyl 9,10-dihydroxystearate, melting at 98.8° to 99.1° C.

Pure allyl 9,10-dihydroxystearate melting at 59.8° to 60.7° C. was obtained when 9,10-dihydroxystearic acid, melting point 95° C. was used in place of the acid melting at 130° C. in the foregoing example.

EXAMPLE II

A mixture of 9,10-dihydroxystearic acid, melting point 130° C. (15.8 g.), beta-chloroallyl alcohol (2-chloroallyl alcohol) (46.3 g.) naphthalene-beta-sulfonic acid (0.316 g.) and benzene (200 ml.) was refluxed for about 6 hours. The reflux was condensed into a modified Dean and Stark tube, which permitted separation of the water formed during esterification and return of the benzene to the reaction mixture. The reaction mixture was evaporated to dryness and the solid residue was melted and washed with hot water. The washed product was broken up and dried. It weighed about 20 g. and consisted mainly of beta-chloroallyl 9,10-dihydroxystearate. Recrystallization to constant melting point from 95% ethyl alcohol yielded pure beta-chloroallyl 9,10-dihydroxystearate melting at 98.2° to 98.4° C.

Pure beta-chloroallyl 9,10-dihydroxystearate, melting at 67.3° to 67.7° C. was obtained by an identical procedure using 9,10-dihydroxystearic acid, melting point 95° C. as the starting material.

EXAMPLE III

Metallic sodium (0.4 g.) was added in small portions to methallyl alcohol (2-methylallyl alcohol) (72 g.) and the mixture was shaken occasionally until the sodium was dissolved. Methyl 9,10-dihydroxystearate, melting point 104° C. (16.6 g.) was added and the mixture was heated on the steam bath for about 3 hours with occasional shaking. The reaction product was isolated as described in Example I. It weighed about 18 g. and consisted mainly of methallyl 9,10-dihydroxystearate. Recrystallization to constant melting point from 95% ethyl alcohol yielded pure methallyl 9,10-dihydroxystearate, melting at 92.8° to 93.3° C. Pure methallyl 9,10-dihydroxystearate melting at 60.5° to 61.0° was obtained by an identical procedure from methyl 9,10-dihydroxystearate melting point 70° C.

The following example illustrates the preparation of copolymers of unsaturated esters of 9,10-dihydroxystearic acid with active olefinic monomers.

EXAMPLE IV

A mixture of freshly distilled vinyl acetate and an allyl, methallyl, or 2-chloroallyl ester of 9,10-dihydroxystearic acid was blended with 0.5% by weight of benzoyl peroxide and polymerized by heating first at about 48° to 50° C. for 72 hours, then at about 65° to 75° C. for 48 hours, and finally at about 85° C. for 24 hours.

The composition of the monomer mixtures used and the physical properties of the resulting polymerization products are shown in the following table:

Composition of monomer mixture (in parts by weight)

| Ester of 9,10-Dihydroxystearic acid | Vinyl Acetate | Polymerizate |
|---|---|---|
| Allyl ester | 0 | 100 | Hard, glass-like. |
| Do | 1 | 99 | Do. |
| Do | 9 | 91 | Tough, hard. |
| Do | 20 | 80 | Viscous liquid. |
| Do | 30 | 70 | Do. |
| Do | 40 | 60 | Do. |
| Methallyl ester | 1 | 99 | Hard, glass-like. |
| Do | 9 | 91 | Tough, hard. |
| Do | 20 | 80 | Soft, elastic. |
| Do | 30 | 70 | Glue-like. |
| Do | 40 | 60 | Do. |
| 2-Chloroallyl ester | 1 | 99 | Hard, glass-like. |
| Do | 9 | 91 | Tough, hard. |
| Do | 20 | 80 | Tough, elastic. |
| Do | 30 | 70 | Viscous liquid. |
| Do | 40 | 60 | Do. |

The above tabulated products were obtained using esters derived from either of the two 9,10-dihydroxystearic acids.

Similar products are obtained when other active olefinic monomers, such as vinyl chloride, diallyl phthalate, acrylonitrile, polymerizable derivatives of maleic acid anhydride, isobutylene, isoprene, styrene, and butadiene, singly or in combination, are used in place of the vinyl acetate in the foregoing example. In place of the allyl, methallyl, and 2-chloralyl esters, there can be used others; for example, those described in application, Serial No. 665,040.

Other organic peroxides and similar polymerization catalyst such as persulfates and the like can be used in place of benzoyl peroxide. Polymerization can be conducted by maintaining the monomer mixture at any temperature within the range of about 40° to 100° C. for a sufficient length of time; the rate of polymerization increasing with the temperature.

The invention is not restricted to 9,10-dihydroxystearic acid. It is within the broad purview of our invention to employ other fat acids, particularly hydroxy-fat acids, preferably those containing from 12 to 24 carbon atoms having at least two hydroxy groups on adjacent carbon atoms, and to the corresponding epoxy compounds. Among such are the corresponding unsaturated esters of 12-hydroxystearic acid and 9,10,12-trihydroxystearic acid, and like derivatives of other fat acids.

Cross-reference is made to the companion application of Swern and Dickel, Serial No. 762,783, filed July 22, 1947, disclosing resins prepared by conjoint polymerization of the corresponding unsaturated esters of oleic acid with vinyl compounds or other active monomeric olefinic polymerizable compounds.

Having thus described the invention, what is claimed is:

1. A resinous product obtained by conjointly polymerizing 1 to 40 percent of allyl 9,10-dihydroxystearate with 99 to 60 percent of vinyl acetate.

2. A resinous product obtained by conjointly polymerizing 1 to 40 percent of methallyl 9,10-dihydroxystearate with 99 to 60 percent of vinyl acetate.

3. A resinous product obtained by conjointly polymerizing 1 to 40 percent of 2-chloroallyl 9,10-dihydroxystearate with 99 to 60 percent of vinyl acetate.

4. A polymeric product obtained by conjointly polymerizing 99 percent to 60 percent of vinyl acetate with 1 to 40 percent of an ester of 9,10-dihydroxystearic acid and an olefinic alcohol containing a terminal methylene group selected from the group consisting of vinyl, allyl, methylallyl, chloroallyl, and bromoallyl alcohols.

5. A process comprising conjointly polymerizing 99 to 60 percent of vinyl acetate with 1 to 40 percent of a 9,10-dihydroxystearic acid ester of an olefinic alcohol containing a terminal methylene group selected from the group consisting of vinyl, allyl, methylallyl, chloroallyl, and bromoallyl alcohols; by heating in the presence of a polymerization catalyst taken from the group consisting of organic peroxides and inorganic persulfates.

6. The process of claim 5 in which the ester is allyl 9,10-dihydroxystearate.

7. The process of claim 5 in which the ester is methallyl 9,10-dihydroxystearate.

8. The process of claim 5 in which the ester is 2-chloroallyl ester of 9,10-dihydroxystearic acid.

9. A process comprising conjointly polymerizing 99 to 60 percent of a monomeric polymerizable compound having an olefinic bond with 1 to 40 percent of 9,10-dihydroxystearic acid ester of an olefinic alcohol containing a terminal methylene group selected from the group consisting of vinyl, allyl, methylallyl, chloroallyl, and bromoallyl alcohols; by heating in the presence of a polymerization catalyst taken from the group consisting of organic peroxides and inorganic persulfates.

10. The process of claim 9 in which the monomeric polymerizable compound is a vinyl ester.

DANIEL SWERN.
GERALDINE B. DICKEL.

REFERENCES CITED

The following references are of record in the file of this patent:

UNITED STATES PATENTS

| Number | Name | Date |
|---|---|---|
| 2,118,864 | Reppe et al. | May 21, 1938 |
| 2,160,941 | Britton et al. | June 6, 1939 |
| 2,356,871 | Moffett | Aug. 29, 1944 |
| 2,374,081 | Dean | Apr. 17, 1945 |
| 2,400,873 | Bruson | May 28, 1946 |